United States Patent [19]

Dahlhaus et al.

[11] Patent Number: 5,271,629
[45] Date of Patent: Dec. 21, 1993

[54] RADIAL SHAFT SEALING RING

[75] Inventors: Ulrich Dahlhaus, Edingen; Rolf Vogt, Oftersheim, both of Fed. Rep. of Germany

[73] Assignee: Firma Carl Freudenberg, Weinheim/Bergstr, Fed. Rep. of Germany

[21] Appl. No.: 995,913

[22] Filed: Dec. 21, 1992

Related U.S. Application Data

[63] Continuation of Ser. No. 670,184, Mar. 4, 1991, abandoned.

[30] Foreign Application Priority Data

Apr. 14, 1990 [DE] Fed. Rep. of Germany ....... 4012160

[51] Int. Cl.$^5$ ............................................. F16J 15/32
[52] U.S. Cl. ...................................... 277/23; 277/24; 277/134; 277/152; 277/153
[58] Field of Search .................. 277/14 V, 23, 24, 134, 277/152, 153

[56] References Cited

U.S. PATENT DOCUMENTS

| | | | |
|---|---|---|---|
| 2,446,380 | 8/1948 | Meyers et al. | 277/134 |
| 2,743,950 | 5/1956 | Helfrecht et al. | 277/134 X |
| 3,640,542 | 2/1972 | Mowat et al. | 277/134 |
| 3,672,690 | 6/1972 | Berenj | 277/134 |
| 3,681,142 | 8/1972 | Schmitt | 277/153 X |
| 3,868,105 | 2/1975 | Bentley | 277/134 |
| 3,929,340 | 12/1975 | Peisker | 277/134 |
| 3,934,888 | 1/1976 | Lutz | 277/134 |
| 4,102,538 | 7/1978 | Bertin | 277/153 |
| 4,155,560 | 5/1979 | Repella | 277/134 X |
| 4,336,945 | 6/1982 | Christiansen et al. | 277/153 |
| 4,350,347 | 9/1982 | Heinrich | 277/134 X |
| 4,399,998 | 8/1983 | Otto | 277/134 |
| 4,550,920 | 11/1985 | Matsushima | 277/134 |
| 4,610,319 | 9/1986 | Kalsi | 277/134 X |
| 4,616,836 | 10/1986 | Drygalski et al. | 277/134 X |
| 4,709,930 | 12/1987 | Forch | 277/134 X |
| 4,815,749 | 3/1989 | Johnston | 277/134 |
| 5,143,385 | 9/1992 | Sponagel et al. | 277/152 |

FOREIGN PATENT DOCUMENTS

| | | | |
|---|---|---|---|
| 0083614 | 2/1977 | Australia | 277/134 |
| 0357875 | 5/1989 | European Pat. Off. | 277/152 |
| 0362468 | 5/1989 | European Pat. Off. | 277/152 |
| 2348739 | 12/1972 | Fed. Rep. of Germany | 277/134 |
| 2363715 | 7/1974 | Fed. Rep. of Germany | |
| 2736207 | 2/1979 | Fed. Rep. of Germany | 277/134 |
| 3619309 | 9/1987 | Fed. Rep. of Germany | 277/152 |
| 1334849 | 7/1963 | France | 277/24 |
| 1376589 | 9/1964 | France | 277/153 |
| 1094515 | 12/1967 | United Kingdom | 277/134 |
| 1196451 | 6/1970 | United Kingdom | 277/134 |

Primary Examiner—William A. Cuchlinski, Jr.
Assistant Examiner—James K. Folker
Attorney, Agent, or Firm—Felfe & Lynch

[57] ABSTRACT

A radial shaft sealing ring has a filtering device which is disposed upstream of main seal. The filtering device comprises a sealing lip 3 which surrounds the shaft to be sealed with a cylindrical surface 5 spaced radially apart at a distance D, this gap being of a capillary narrowness. On the axial end facing chamber A to be sealed, the cylindrical surface 5 is bounded by a conical surface 10 which encloses a conical angle of 60 to 120 degrees.

5 Claims, 2 Drawing Sheets

F I G. 2
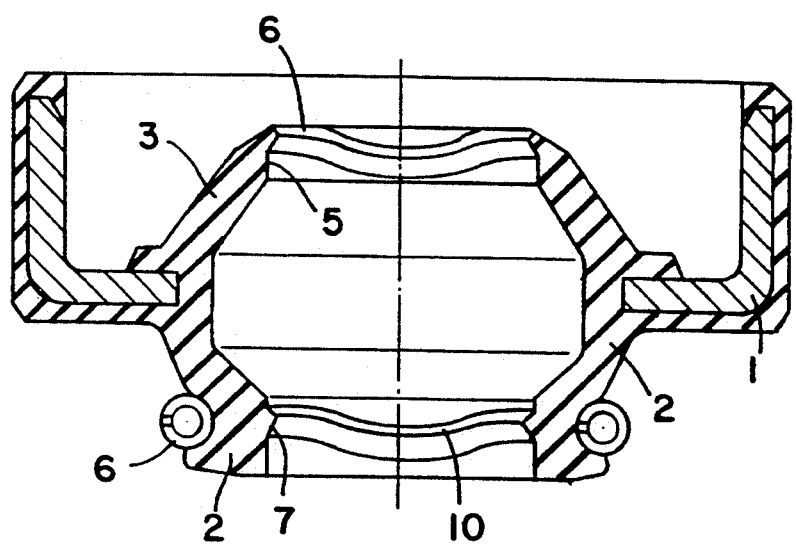

RADIAL SHAFT SEALING RING

This application is a continuation of application Ser. No. 670,184 filed Mar. 4, 1991, now abandoned.

The invention relates to a radial shaft sealing ring comprising a support ring with an L-like profile and an arm which radially protrudes toward the inside. A main seal made of a polymeric material is affixed to this arm. Further included is a filtering device for removing solid substances which is disposed upstream of the main seal in the direction toward the sealed chamber. The filtering device tightly contacts the shaft with the interspace between the main seal and filtering device being filled with a lubricating material.

BACKGROUND OF THE INVENTION

A radial shaft sealing ring of this kind is known from DE-OS 23 63 715. The filtering device thereof comprises a screen disposed upstream of the main seal. In its center portion, this screen has a sealing element, and it interacts with the shaft. It can keep solid material contained in the medium to be sealed from the main device only for an insufficient period of time.

An object of the invention is directed to the task of further developing a radial shaft sealing ring of this kind such that the solid material contained in the medium to be sealed is kept from the main seal for a substantially longer period of time.

This object is accomplished in accordance with the invention with a radial shaft sealing ring of the aforesaid kind in that the filtering device comprises a radially elastic sealing lip impermeable to liquid, this lip surrounding the shaft to be sealed with a cylindrical surface spaced radially apart at a distance D, in that the gap formed by this distance D is of capillary-active narrowness, in that at least one sealing edge, which radially projects from the cylindrical surface toward the inside, extends into the gap, this sealing gap having a radial height which is smaller than the radial width of the gap, in that the sealing edge, in a sinuous course, surrounds the shaft on its entire circumference and reaches, at regularly occurring circumferential distances, at least the axial end of the cylindrical surface which is closest to chamber A to be sealed, and in that, outside the cylindrical surface, the sealing lip has a wedge-like profile receding from chamber A to be sealed. Due to the capillary-active narrowness, the gap between the sealing lip and the surface of the shaft to be sealed is always filled with a lubricant or medium to be sealed. This anticipates wear of the sealing edge in an excellent manner. It is of particular importance that when the shaft rotates, the medium contained in the gap is always in a relative movement which includes circumferentially and axially directed components of movement. Solid particles arriving at the gap from the area of the chamber are thus not only prevented from entering the gap but in addition, they are fed to those circumferential spots where the sealing edge reaches the axial end of the cylindrical surface which faces toward the chamber to be sealed. Radially outside the cylindrical surface, the sealing lip has a wedge-like profile receding from chamber A to be sealed. Especially in the area of the aforesaid circumferential spots, the particles rejected by the gap are radially deflected toward the outside. It is believed that this substantially improves the service life of the radial shaft sealing ring.

The main seal, which is downstream of the sealing lip can be provided with a hydrodynamically acting conveying device for the medium to be sealed, this device being effective in the direction toward the sealing lip. The pressure so generated in the interstice between the main seal and the sealing lip can cause the sealing edge to be lifted up from the surface of the shaft to be sealed which requires that the sealing edge of the sealing lip contacts the surface of the shaft at least partially flatly and which further favors the improvement of the service life. Such an effect is particularly efficient when only the main seal is pressed against the shaft by means of an annular helical spring made of a metallic material and when no such annular helical spring is applied to generate contact pressure for the sealing lip to be pressed against the shaft. For a new radial shaft sealing ring there will thus be a stronger contact pressure between the main seal and shaft to be sealed, with respect to the sealing lip.

The radial shaft sealing ring of the invention is particularly well suited for oil-covered segments of vertically disposed shafts which are to be sealed. The preferred field of application is found in segments to be sealed in the bottom of oil-containing casings.

For a better understanding of the invention, together with other and further objects thereof, reference is made to the following description, taken in connection with the accompanying drawings, and its scope will be pointed out in the appended claims.

SUMMARY OF THE INVENTION

In accordance with the invention, a radial shaft sealing ring comprises a support ring with a L-like profile and an arm protruding in the radial direction toward an inside. The sealing ring includes a main seal made of a polymeric material affixed to the arm and comprising a filtering device for the separation of solid material disposed upstream of the main seal in the direction of a chamber to be sealed and in tight contact with the shaft. The sealing ring includes an interstice between the main seal and filtering device and a shaft to be sealed, the interstice being filled with a lubricant. The filtering device is a radially elastic sealing lip impermeable to liquid which surrounds the shaft to be sealed with a cylindrical surface at a radial distance D, the gap formed by this distance being of capillary-active narrowness and a radial height of the gap being smaller than a radial width of the gap. At least one sealing edge which protrudes from the cylindrical surface radially toward the inside extends into this gap. In a sinuous course, the sealing edge surrounds the shaft on its entire circumference and makes contact with an axial end of the cylindrical surface facing toward the chamber to be sealed at regularly occurring circumferential distances. Radially outside the cylindrical surface, the sealing lip has a wedge-like profile receding from the chamber to be sealed.

BRIEF DESCRIPTION OF THE DRAWINGS

Referring now to the drawings:

FIG. 2 is a longitudinal cross section of the radial shaft sealing ring of FIG. 1.

DESCRIPTION OF THE PREFERRED EMBODIMENT

Figure 1:
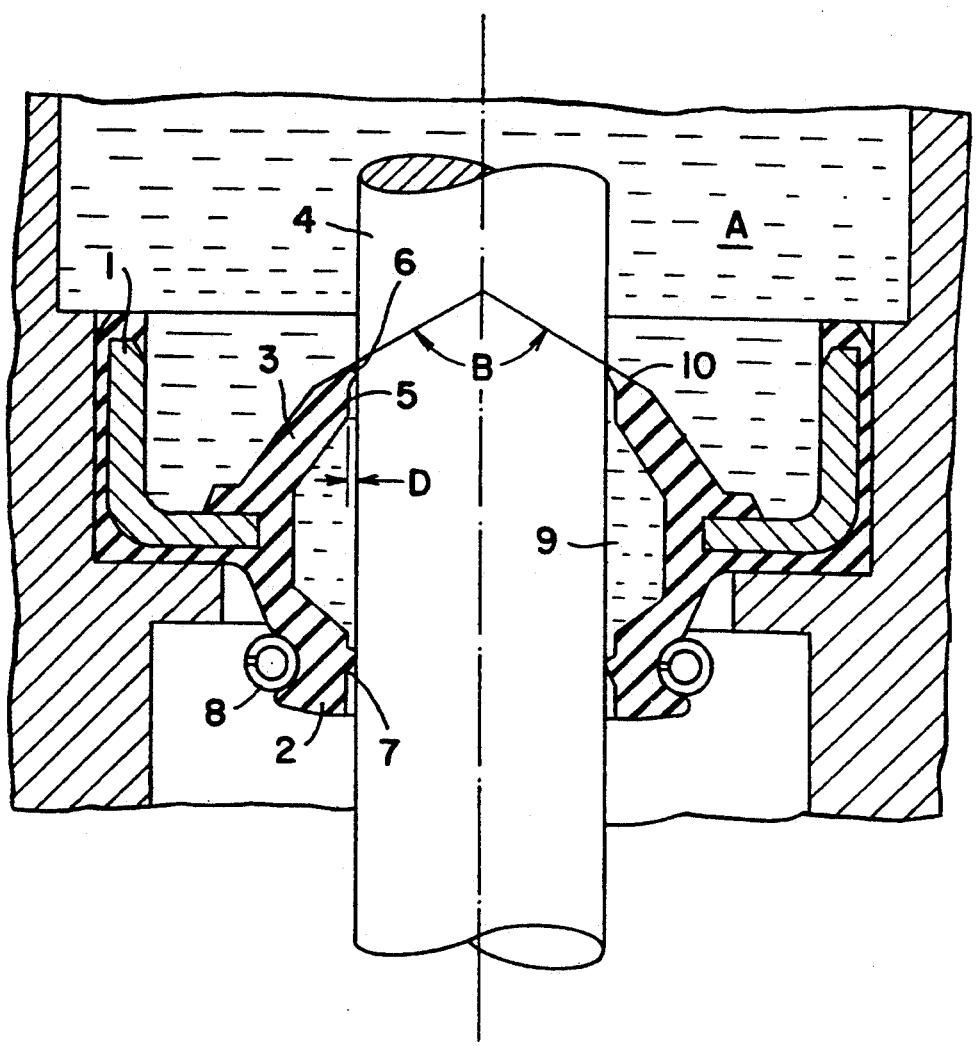
FIG. 1 is a sectional view of a radial shaft sealing ring in accordance with the invention when assembled.

The radial shaft sealing ring which is represented as assembled in FIG. 1 is disposed in the bottom area of an oil-filled casing at the one portion of the wall where the shaft 4 vertically traverses. The radial shaft sealing ring comprises a support ring 1 having an L-like profile and an arm which radially protrudes toward the inside. A main seal 2 made of a polymeric material is affixed to this arm. Further, the sealing ring comprises a filtering device for the separation of solid components which is disposed upstream in direction of chamber A to be sealed. The interstice 9 between the main seal 2 and the filtering device is filled with a lubricant, for example grease. The filtering device includes a radially elastic sealing lip 3 which is. impermeable to liquid and made of an elastomeric material. Together with the main seal, it is configured as one piece. The sealing lip 3 surrounds the shaft to be sealed with a cylindrical surface 5 while being radially spaced apart from it at a distance D. The gap so formed by this distance D is of capillary-active narrowness, and from the cylindrical surface 5, a sealing edge 6 extends in radial direction toward the inside. The sealing edge 6 sinuously surrounds the shaft on the entire circumference (FIG. 2). Contact is made with the axial end of the cylindrical surface 5 which faces the chamber A to be sealed at regular circumferential distances. When the shaft rotates, the radial height is smaller than the radial width of the gap. It amounts to at least 0.5 times the value of the radial width. Beginning at the axial end of the cylindrical surface 5 which faces chamber A to be sealed, the sealing lip 3 has a wedge-like profile receding from sealing chamber A. The so-formed conical surface 10, which surrounds the sealing lip 3 on the outside, has a conical angle of 60 to 120 degrees, preferably a conical angle of 80 to 100 degrees.

An annular helical spring 8 made of a metallic material presses the main seal 2 against the surface of the shaft 4 to be sealed. Since the annular helical spring 8 is largely free of relaxation due to metallic material of which it is made, there is a uniform contact pressure of main seal 2 to the surface of the shaft 4 over longer periods of time.

At its inside, the main seal 2 has a hydrodynamically acting return-transport element for conveying medium to be sealed, which arrives from the direction of chamber A to be sealed, back in direction toward this chamber A while the shaft rotates. The hydrodynamically acting return-transport element 7 surrounds shaft 4 while being in contact therewith over the entire circumference. While having an asymmetric profile, it follows a sinuous course and is disposed on a cylindrical surface of the main seal 2.

The function is described as follows:

Due to its capillary-active narrowness, the gap between the cylindrical surface 5 and the shaft 4 is always filled with medium to be sealed when the shaft is not in rotation. When the shaft does rotate, the circumferentially directed relative movement, on the side of the shaft, and the sinuous course of the sealing edge 6, on the side, of the sealing edge cause this medium to move back and forth in a circumferentially directed movement, on the one side, and an axially directed movement, on the other side. The liquid contained in the gap is thus continuously renewed and supplied to those places at the circumference where the cylindrical surface 5 and the conical surface 10 intersect. Solid particles arriving from the direction of chamber A to be sealed are thus continuously fed to said places at the circumference where the cylindrical surface 5 and the conical surface 10 intersect and, via conical surface 10, they are deflected in a radial direction toward the outside. They cannot be deposited in the area of the gap thus causing damage to adjacent surfaces. The medium to be sealed can at the same time axially pass the gap in direction to the interstice 9 and reach the main seal 2. The lubrication required for long service life of the main seal 2 is thus always ensured.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A radial shaft sealing ring comprising:

a support ring with an L-like profile and an arm protruding in a radial direction toward an inside;

a main seal made of a polymeric material affixed to said arm and a filtering device for the separation of solid material disposed upstream axially ahead of the main seal in a direction of the chamber to be sealed and in tight contact with a shaft for keeping solids away from the main seal;

an interstice between the main seal and filtering device and a shaft to be sealed being filled with a lubricant;

the filtering device being a radially elastic sealing lip impermeable to liquid which surrounds the shaft to be sealed with a cylindrical surface at a radial distance D, a gap formed by said distance being of capillary-active narrowness, a radial height of said gap being smaller than a radial width of said gap;

the main seal protruding downstream from the arm and the filtering device protruding upstream from the arm;

at least one sealing edge which protrudes from the cylindrical surface radially toward the inside, extending into said gap;

the sealing edge surrounding the shaft in a sinuous course on its entire circumference and making contact with an axial portion of the cylindrical surface closest to the chamber to be sealed at regularly occurring circumferential distances, and radially outside the cylindrical surface, the sealing lip having a wedge-like profile receding from a chamber to be sealed.

2. A radial shaft sealing ring in accordance with claim 1, in which the main seal is disposed downstream of the sealing lip and has a hydrodynamic transporting device for the medium to be sealed which is active in a direction toward the sealing lip.

3. A radial shaft sealing ring in accordance with claim 2, which includes an annular helical spring and in which only the main seal is pressed against the shaft to be sealed by means of the annular helical spring.

4. A radial shaft sealing ring in accordance with claim 3, in which the main seal is pressed against the shaft to be sealed with a greater force than the sealing lip.

5. A radial shaft sealing ring in accordance with claim 1 being in the area of an oil-covered segment of a vertically disposed shaft which is to be sealed.

* * * * *